US008326863B2

United States Patent
Yoshii et al.

(10) Patent No.: US 8,326,863 B2
(45) Date of Patent: Dec. 4, 2012

(54) IMAGE PROCESSING APPARATUS, DATA DELIVERY METHOD AND DATA DELIVERY PROGRAM

(75) Inventors: Masayuki Yoshii, Sakai (JP); Takeshi Morikawa, Takarazuka (JP); Nobuo Kamei, Amagasaki (JP); Kei Shigehisa, Amagasaki (JP); Takeshi Minami, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 384 days.

(21) Appl. No.: 12/041,195

(22) Filed: Mar. 3, 2008

(65) Prior Publication Data

US 2008/0222169 A1     Sep. 11, 2008

(30) Foreign Application Priority Data

Mar. 6, 2007  (JP) ................................ 2007-056423

(51) Int. Cl.
*G06F 7/00*      (2006.01)
*G06F 17/30*     (2006.01)
(52) U.S. Cl. .......................... 707/769; 707/812; 709/206
(58) Field of Classification Search ........................ None
See application file for complete search history.

(56) References Cited

U.S. PATENT DOCUMENTS

| | | | | |
|---|---|---|---|---|
| 5,598,279 | A | | 1/1997 | Ishii et al. |
| 7,263,528 | B2 * | | 8/2007 | Haff et al. ........................ 707/622 |
| 7,421,514 | B2 * | | 9/2008 | Lee ................................ 709/246 |
| 7,756,512 | B2 * | | 7/2010 | Ikeda et al. ................. 455/412.1 |
| 7,774,444 | B1 * | | 8/2010 | George et al. .................. 709/223 |
| 2006/0031310 | A1 * | | 2/2006 | Lee ................................ 709/206 |
| 2006/0053481 | A1 * | | 3/2006 | Olsen et al. ........................ 726/3 |
| 2006/0056832 | A1 * | | 3/2006 | Yamaguchi et al. ............. 396/56 |
| 2006/0176901 | A1 | | 8/2006 | Terai et al. |
| 2006/0212497 | A1 * | | 9/2006 | Tomita ........................... 707/205 |
| 2008/0313295 | A1 * | | 12/2008 | Lee ................................ 709/206 |
| 2009/0094335 | A1 * | | 4/2009 | Edmonds et al. .............. 709/206 |

FOREIGN PATENT DOCUMENTS

| | | |
|---|---|---|
| JP | 03-151759 | 6/1991 |
| JP | 05-191448 | 7/1993 |
| JP | 7-177277 A | 7/1995 |
| JP | 10-107937 | 4/1998 |
| JP | 2003-288306 | 10/2003 |
| JP | 2004-112489 | 4/2004 |
| JP | 2004-201243 A | 4/2004 |
| JP | 2006-215968 | 8/2006 |
| JP | 2006-235726 | 9/2006 |

OTHER PUBLICATIONS

Notification of Reasons for Refusal in JP 2007-056423 dated Feb. 3, 2009, and an English Translation thereof.

* cited by examiner

*Primary Examiner* — Loan T Nguyen
(74) *Attorney, Agent, or Firm* — Buchanan Ingersoll & Rooney PC

(57) ABSTRACT

An image processing apparatus comprises: a personal storage area provided for a user; a group storage area shared with a plurality of users who are members of a group; an identifier that identifies from one consolidated data that is made from user's data created for one or more than one user of the group and inputted in the group storage area, a personal storage area(s) to which the user's data are to be delivered; and a transmitter that transmits the user's data to the personal storage area(s) identified by the identifier.

27 Claims, 11 Drawing Sheets

| Group Name | User Name | Document Data |
|---|---|---|
| G1 | | |
| 57 | A | |
| 58 | B | |
| 59 | C | |
| G2 | | |
| 60 | D | |
| 61 | E | |
| G3 | | |
| 62 | F | |
| 63 | G | |

51 = Group Name column
52 = User Name column
50 = table

FIG.5

IMAGE PROCESSING APPARATUS, DATA DELIVERY METHOD AND DATA DELIVERY PROGRAM

This application claims priority under 35 U.S.C. §119 to Japanese Patent Application No. 2007-56423 filed on Mar. 6, 2007, the entire disclosure of which is incorporated herein by reference in its entirety.

BACKGROUND OF THE INVENTION

1. Field of the Invention

The present invention relates to an image processing apparatus having storage areas to store data of document or image, etc. by groups or users therein, a data delivery method to deliver the data to storage areas of individual users respectively, and a data delivery program stored in a computer readable recording medium in order to make a computer of the image processing apparatus execute data delivery processing.

2. Description of the Related Art

The following description sets forth the inventor's knowledge of related art and problems therein and should not be construed as an admission of knowledge in the prior art.

In recent years, some of the image processing apparatuses typified by MFPs (Multi Function Peripherals) that are digital multifunctional machine, have personal storage areas provided for individual users therein, and data can be exchanged between the personal storage areas.

Meanwhile, a mailing list is a well known method to deliver data to a plurality of users by email. By using a mailing list, one same message is delivered to a plurality of users at one time. However, a mailing list is not meant to be used in a case where a sender user would like to deliver different data to a plurality of users respectively, at one time. In this case, he/she should bother to create different messages and transmit the messages to a plurality of users one by one.

There is the same problem mentioned above, in data delivery performed between personal storage areas in the image processing apparatus. If a sender user would like to deliver different data to a plurality of personal storage areas (to a plurality of users), he/she should bother to create different data and transmit the data to personal storage areas manually one by one, which requires many operations and time.

According to an art disclosed in Japanese Unexamined Laid-open Patent Publication No. 7-177277, if information such as an image or a document is stored in a recording medium, particular information among those stored therein is automatically deleted.

With the art disclosed in the publication above, although memory capacity of a recording medium is saved by erasing particular information among those stored therein, the problem of many operations to transmit different data to a plurality of personal storage areas in an image processing apparatus one by one, is not completely resolved.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide an image processing apparatus that enables a sender user to deliver different data to a plurality of personal storage areas of users, at one time by simple operations.

It is another object of the present invention to provide a data delivery method that enables a sender user to deliver different data to a plurality of personal storage areas of users, at one time by simple operations.

It is yet another object of the present invention to provide a data delivery program stored in a computer readable medium to make a computer of the image processing apparatus data delivery processing.

According to a first aspect of the present invention, an image processing apparatus comprises:

a personal storage area provided for a user;

a group storage area shared with a plurality of users who are members of a group;

an identifier that identifies from one consolidated data that is made from user's data created for one or more than one user of the group and inputted in the group storage area, a personal storage area(s) to which the user's data are to be delivered; and a transmitter that transmits the user's data to the personal storage area(s) identified by the identifier.

According to a second aspect of the present invention, a data delivery method comprises:

identifying from one consolidated data that is made from user's data created for one or more than one user of a group and inputted in a group storage area shared with a plurality of users that are members of the group, a personal storage area(s) to which the user's data are to be delivered; and transmitting the user's data to the identified personal storage area(s).

According to a third aspect of the present invention, a data delivery program is stored in a computer readable medium to make a computer of an image forming apparatus execute:

identifying from one consolidated data that is made from user's data created for one or more than one user of a group and inputted in a group storage area shared with a plurality of users that are members of the group, a personal storage area(s) to which the user's data are to be delivered; and transmitting the user's data to the identified personal storage area(s).

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 5 is an exemplified form of consolidated data used in this embodiment;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
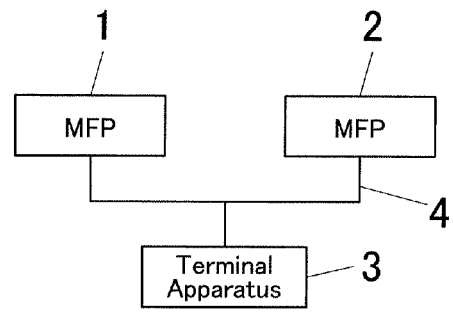
FIG. 1 is a view showing a configuration of a data delivery system in which an image processing apparatus according to one embodiment of the present invention is employed.

FIG. 1 is a view showing an overall configuration of a data delivery system in which an image processing apparatus according to a first embodiment of the present invention is employed.

In the following embodiments, a sender user delivers documents to users. However, the data to be delivered is not limited to documents, and can be another data.

The data delivery system comprises an image processing apparatus 1, an image processing apparatus 2 and a terminal apparatus 3, and the image processing apparatuses 1 and 2, and the terminal apparatus 3 are interconnected via a network 4.

The image processing apparatuses 1 and 2 are MFPs that are digital multifunctional machines used as image forming apparatuses, and print and store data read out from a document by a scanner 12 according to an instruction given by a user using an operation panel 17 (shown in FIG. 2) and data received from the terminal apparatus 3 via the network 4.

The terminal apparatus 3 is a personal computer, and stores software for document creation, etc., and other various software including printer drivers to use the image processing apparatuses 1 and 2. If a user creates a document, etc. using the exclusive software and gives an instruction to output the document, then a printer driver generates a print job and transmits the job to the image processing apparatus 1 or 2 via the network 4.

Hereinafter, a configuration of the image processing apparatus 1 will be explained. Since the image processing apparatus 2 has exactly the same configuration as that of the image processing apparatus 1, its explanation will be omitted.

Figure 2:
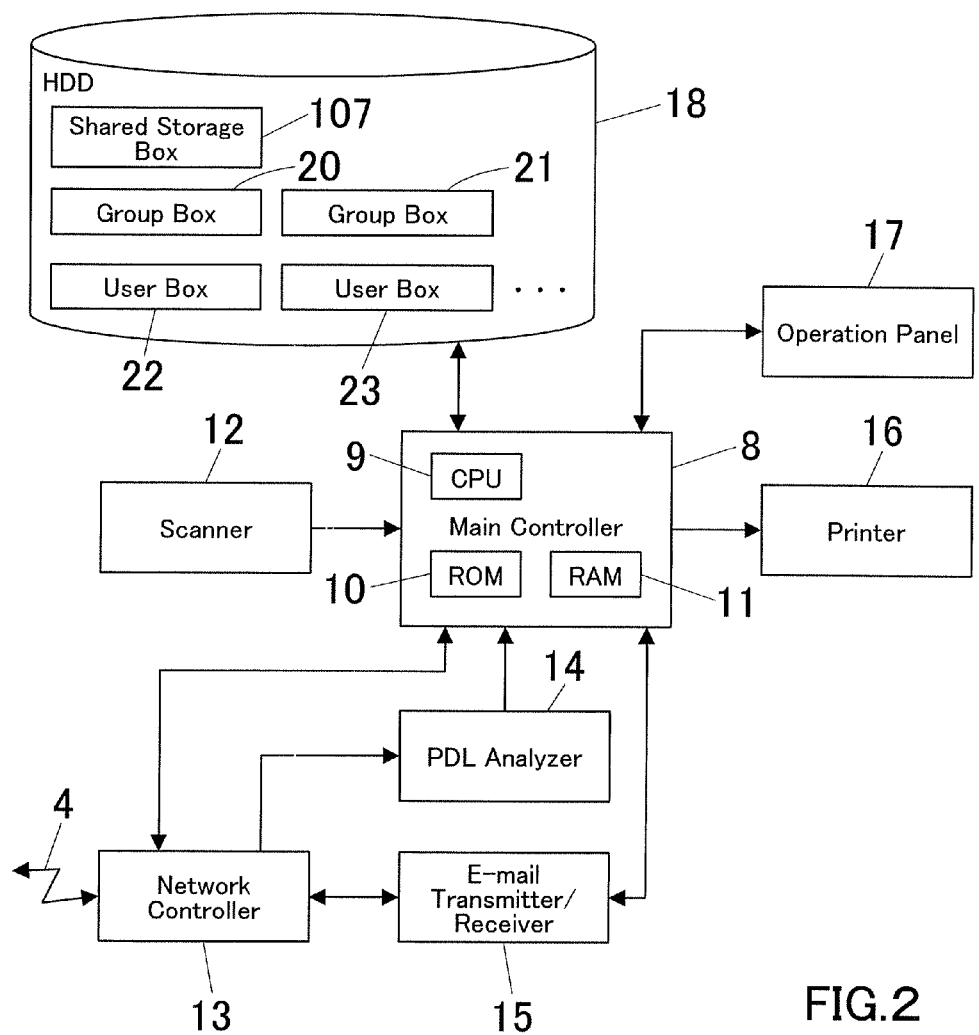
FIG. 2 is a block diagram showing an electrical configuration of the image processing apparatus.

As shown in FIG. 2, the image processing apparatus 1 comprises a main controller 8, a scanner 12, a network controller 13, a printer description language analyzer (hereinafter referred to as "PDL analyzer") 14, an e-mail transmitter/receiver 15, a printer 16, an operation panel 17, and a hard disk (referred to as "HDD").

The controller 8 controls the overall image processing apparatus 1, and comprises a CPU 9 that executes all functions of the image processing apparatus 1, a ROM 10 that stores an operation program for the CPU 9 and other data, and a RAM 11 that provides an operating area for the CPU 9 to execute processing according to the program. The functions of the image processing apparatus 1, which are executed by the CPU 9, include the basic ones expected for an image processing apparatus, such as scanning, printing, and transmitting/receiving data, and further in this embodiment, other functions enabled by using storage areas (hereinafter referred to also as "Boxes") such as personal storage areas and group storage areas to be detailed later.

The scanner 12 reads a document set by a user and converts it into image data that is electronic data, then outputs the image data to the main controller 8.

The network controller 13 exchanges data with the image processing apparatus 2 and the terminal apparatus 3 via the network 4. Concretely, it receives data from the image processing apparatus 2 and the terminal apparatus 3 and transmits the data to the PDL analyzer 14, the e-mail transmitter/receiver 15, etc.

The PDL analyzer 14 analyzes in a predetermined manner print data received from the network controller 13 and converts it into image data, then outputs the image data to the main controller 8.

The e-mail transmitter/receiver 15 converts into image data document data received by e-mail, then outputs the image data to respective processors in the main controller 8.

The printer 16 prints document data read out by the scanner 12, print data received via the network controller 13, etc.

The operation panel 17 displays thereon various screens such as a login screen and a Box-displaying screen, accepts various setting instructions given by a user, and sends a notice of the setting to the main controller 8.

The HDD 18 stores therein document data administered by an accumulated documents administrator (not shown in Figure) in the main controller 8, other data, programs, etc. Further, the HDD 18 has therein various Boxes such as user Boxes 22, 23, 24, 25, 26, 28 and 29 that are personal storage areas storing data by users, one or more than one group Box(es) 20 (and 21) that is (are) a group storage area (group storage areas) storing data by groups, and shared storage Box 107 that is accessed by all users. Yet further, the HDD 18 stores information of users, user Boxes of the users, groups to which the users belong, and group Boxes of the groups.

In this embodiment, in addition to the basic functions expected for a Box such as storing document data and etc., other functions are further executed under the control of the CPU 9 in the main controller 8 as described below.

If one data consolidated from documents created for one or more than one user is inputted in the group Box 20 or 21, a user Box(es) among the user Boxes 22, 23, 24, 25 and 26, to which the documents are to be delivered, is(are) identified based on the consolidated data, and the documents are transmitted to the identified user Box(es). Further, if the consolidated data includes documents created for users of a plurality of groups and group information indicating groups to which the users belong, the documents are detected based on the group information. Further, if the consolidated data includes circulation information to transmit the consolidate data to a plurality of group Boxes in order, the circulation information is detected from the consolidated data and the consolidated data is transmitted to another group Box that is the following destination according to the detected circulation information. Further, if the consolidated data is transmitted to another group Box, the detected documents are deleted from the group Box. Yet further, the shared storage Box 107 is accessed on a periodic basis, and if the consolidated data is newly stored therein, it is obtained and inputted in the group Boxes 20 and 21.

Meanwhile, the shared storage Box 107 has the sorting function. That is, if the consolidated data is newly stored in the shared storage Box 107, the shared storage Box 107 transmits the consolidated data to the group Boxes 20 and 21. Further, if the consolidated data includes documents created for users of a plurality of groups, the shared storage Box 107 detects and sorts by groups the documents, then transmits the documents to the group Boxes.

Hereinafter, group Boxes and user Boxes will be detailed with reference to FIG. 3 and FIG. 4.

Figure 3:
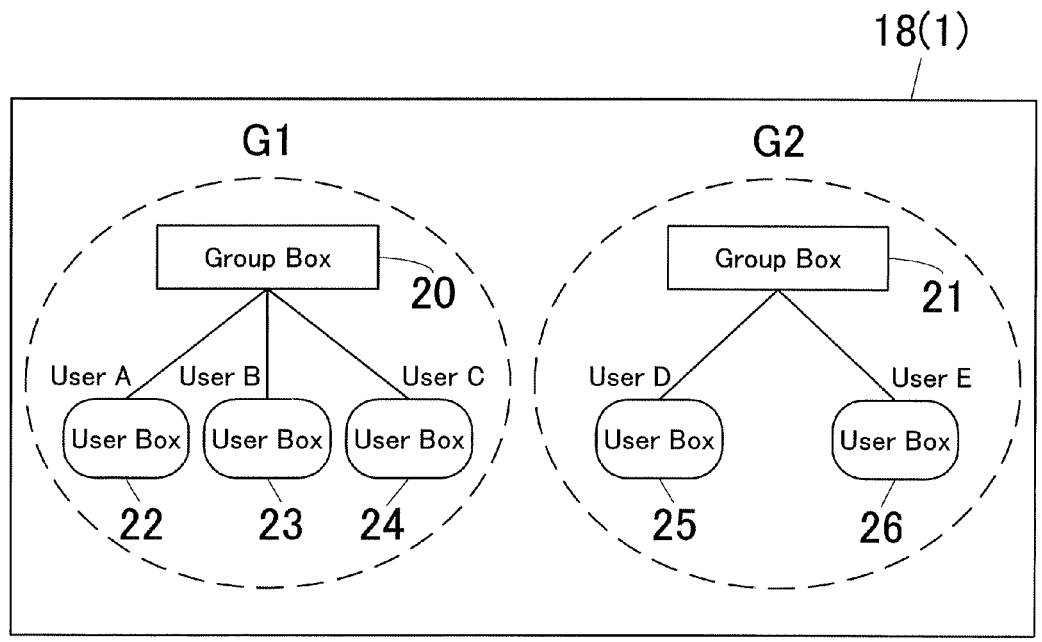
FIG. 3 is a view showing relationships between group Boxes and user Boxes prepared in one image processing apparatus.
Figure 4:
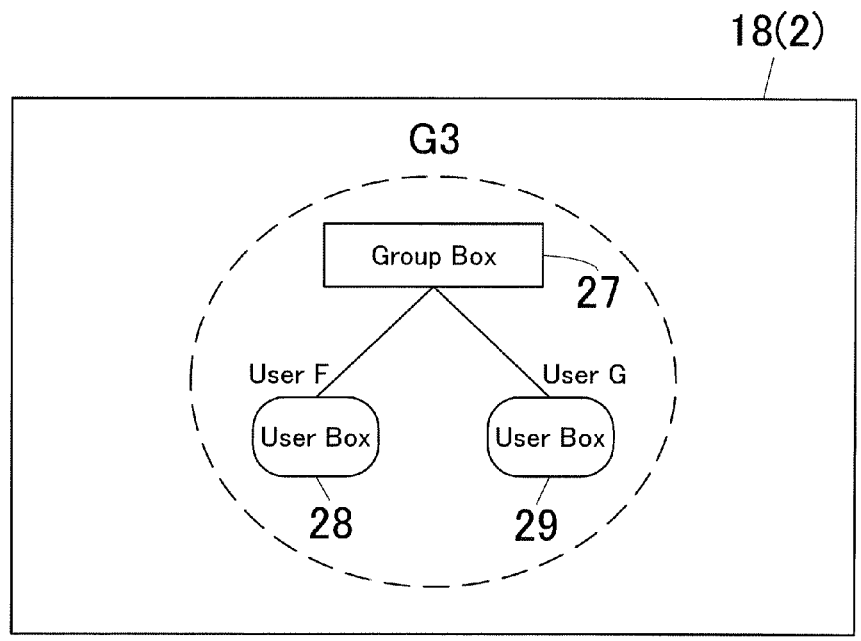
FIG. 4 is a view showing relationships between group Boxes and user Boxes prepared in another image processing apparatus.

As shown in FIG. 3, the image processing apparatus 1 has group Boxes 20 and 21, and user Boxes 22, 23, 24, 25 and 26 of users A, B, C, D and E, respectively. And as shown in FIG. 4, the image processing apparatus 2 has group Box 27, and user Boxes 28 and 29 of users F and G, respectively.

The users A through G using their own user Boxes in the image processing apparatuses 1 and 2, belong to following groups.

The users A, B and C belong to the same group that is a group G1, and documents created for the users A, B and C are transmitted from the group Box 20 to the user Boxes 22, 23 and 24, respectively. The users D and E belong to the same group that is a group G2, and documents created for the users D and E are transmitted from the group Box 21 to the user Boxes 25 and 26, respectively. The users F and G belong to the same group that is a group G3, and documents created for the users F and G are transmitted from the group Box 27 to the user Boxes 28 and 29, respectively.

As described above, the group Boxes 20, 21 and 27 temporarily store documents therein. Further, under the control of the CPU 9 in the main controller 8, consolidated data and documents are transmitted/received, documents created for users of the groups owning the group Boxes are detected from the consolidated data, circulation information to transmit documents in a certain order to a plurality of group Boxes is detected from the consolidated data, and unnecessary data is deleted from the consolidated data.

FIG. 5 shows an exemplified form of one data that is consolidated by a sender user.

As shown in FIG. 5, consolidated data 50 includes documents 57 through 63 created for users of a plurality of groups. The documents 57 through 63 are comprised of user names 52 indicating recipient users to which the documents 57 through 63 are to be delivered, and document data. And those are related to group names 51, respectively. The group names 51 are group information indicating groups to which the documents 57 through 63 are to be transmitted.

In this embodiment, the documents 57, 58 and 59 are to be delivered to the users A, B and C of the group G1, the documents 60 and 61 are to be delivered to the users D and E of the group G2, and the documents 62 and 63 are to be delivered to the users F and G of the group G3.

If the consolidated data 50 is inputted in the group Boxes 20, 21 or 27, the group names 51 that are group information are detected, and documents among the documents 57 through 63 are detected based on the group names 51. Then, the user names 52 are detected from the detected documents, user Boxes to which the documents are to be delivered are identified among user Boxes 22, 23, 24, 25, 26, 28 and 29 based on the user names 52, and the documents are transmitted to the identified user Boxes, respectively.

A method to detect the group names 51 and the user names 52 from the consolidated data 50 is not limited and various heretofore known methods can be used as that method. For example, the group names 51 and the user names 52 can be detected by performing OCR processing on the consolidated data 50 to check whether or not a particular set of characters exist in generated text data.

Further, a form of the consolidated data 50 is not limited to the example shown in FIG. 5, and can be another form that includes group information indicating the group Boxes 20, 21 and 27 directly, not indicating the group names 51, and information indicating the user Boxes 22, 23, 24, 25, 26, 28 and 29 directly, not indicating the user names 52.

<Operations Performed in the Image Processing Apparatus 1>

Figure 6:
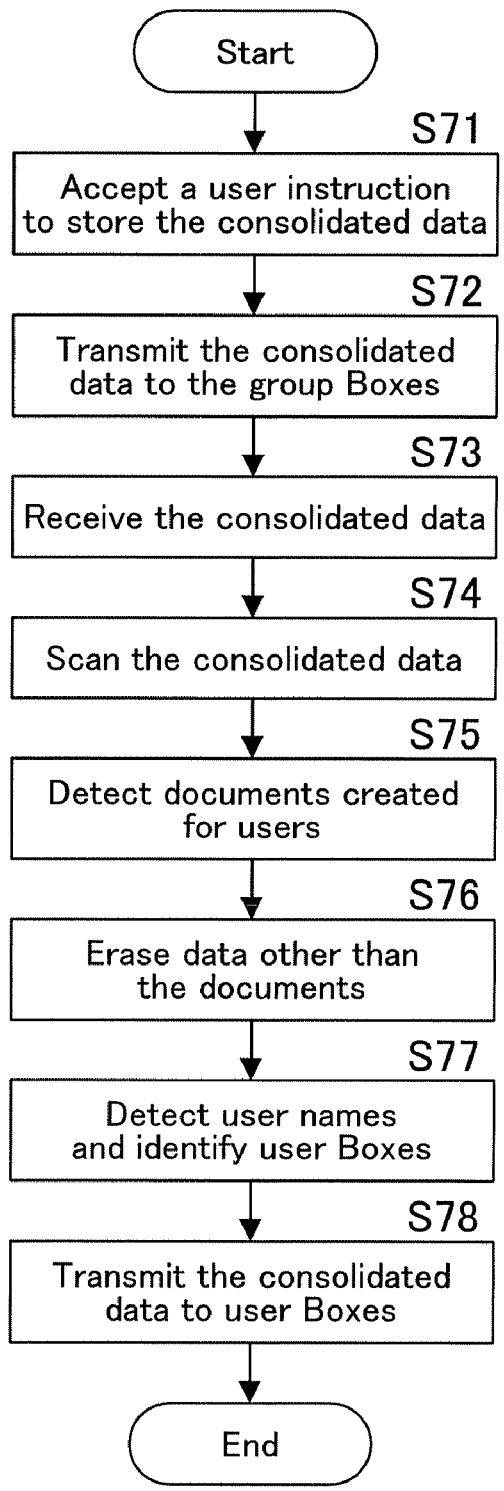
FIG. 6 is a flowchart showing a procedure performed in the image processing apparatus according to a first embodiment of the present invention.

Hereinafter, a procedure performed in the image processing apparatus 1 will be explained with reference to a flowchart shown in FIG. 6. The procedure is executed by the CPU 9 according to a program stored in a recording medium such as the ROM 10.

Preliminarily, a sender user creates the consolidated data 50 shown in FIG. 5 and stores the data in his/her own user Box. And the sender user specifies the consolidated data 50 and gives an instruction to input the data in the group Box 20, 21 and 27, using the operation panel 17 or the terminal apparatus 3. Then, by the CPU 9 of the image processing apparatus 1, this instruction is accepted (Step S71) and the consolidated data 50 is transmitted to the group Box 20, 21 and 27 (Step S72). In this way, the consolidated data 50 is stored in the group Boxes 20, 21 and 27. Alternatively, not the consolidated data 50 preliminarily stored in the own user Box, but the consolidated data read out by the scanner 12 or received from the terminal apparatus 3 via the network 4 is directly inputted in the group Boxes 20, 21 and 27.

Since the group Box 27 is in the image processing apparatus 2, the consolidated data 50 is transmitted to the group Box 27 via the network 4. The following processes are performed in the image processing apparatus 1 on the data 53 and the data 54 stored in the group Boxes 20 and 21, respectively, and in the image processing apparatus 2 on the data 55 stored in the group Box 27.

The group Boxes 20 and 21 receives the consolidated data 50 (Step S73). Then, by the CPU 9, the consolidated data 50 is scanned (Step S74), the group names 51 are detected and documents created for users of groups owning the group Boxes 20 and 21, are detected based on the group names (Step S75). And data other than the detected documents are deleted (Step S76) since it is not necessary any more.

Further, by the CPU 9, the user names 52 are detected from the detected documents and user Boxes to which the documents are to be delivered are identified (Step S77), then the documents are transmitted to the user Boxes (Step S78). In this way, documents created for users are delivered to their own user Boxes, respectively.

Figure 7:
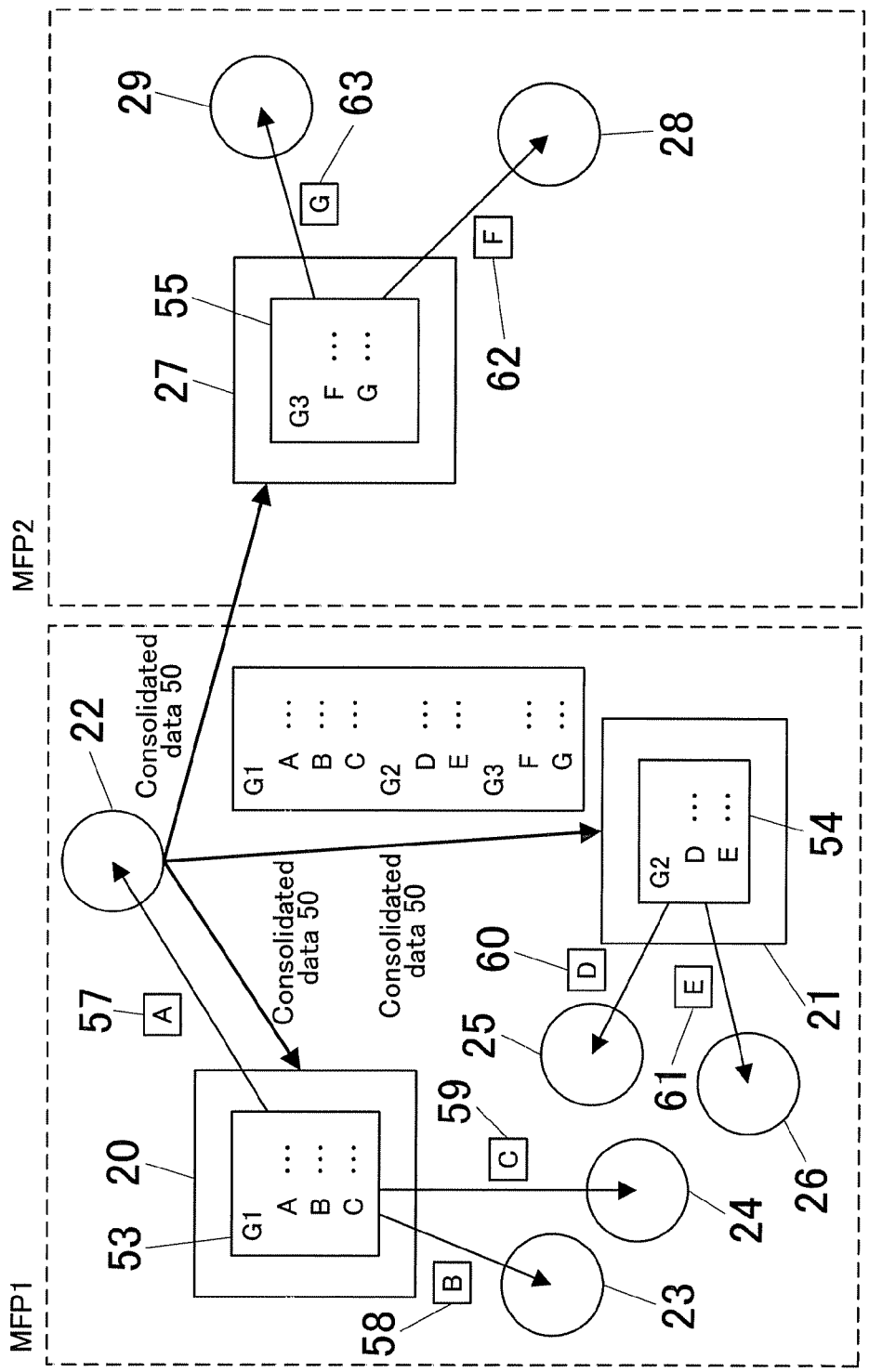
FIG. 7 is a view showing a data flow in the image processing apparatus according to the first embodiment of the present invention.

Switching the view to FIG. 7, if the user A who is a sender user gives an instruction to input in the group Boxes 20, 21 and 27, the consolidated data 50 stored in his/her own user Box 22, the consolidated data 50 is transmitted to the group Boxes 20 and 21, and also to the group Box 27 via the network 4.

In the group Box 20 receiving the consolidated data 50, the documents 57, 58 and 59 created for users of the group G1 are detected and the other data is deleted from the consolidated data 50. Then, user names of the users A, B and C are detected from the documents 57, 58 and 59, and the user Boxes 22, 23 and 24 are identified based on the user names. And then, the documents 57, 58 and 59 are transmitted to the user Boxes, respectively.

Similarly to the case of the data transmitted to the group Box 20 as explained right above, processes are performed on the data transmitted to the group Boxes 21 and 27.

As described above in this embodiment, if the consolidated data 50 is inputted in a group Box, the following processes are automatically performed in the group Box: documents created for users of a group owning the group Box are detected from the consolidated data 50; user names of users to which the documents are to be delivered are detected; user Boxes are identified; and the documents are transmitted to the user Boxes, respectively.

With this configuration, if a sender user simply creates and inputs the consolidated data 50 in a group Box, different documents are automatically delivered to a plurality of users at one time, which resolves the problem of many operations to transmit documents to a plurality of users manually one by one.

In the first embodiment described above, the consolidated data 50 including the documents 57 through 63 created for users of a plurality of groups is inputted in the group Boxes 20, 21 and 27. However, the consolidated data 50 including documents created for users of one group can be inputted in one group Box of the group. Further, the documents are not necessarily transmitted to user Boxes of all users of the group, and can be transmitted at least to one user (one user Box) of the group.

Further, if the group Boxes 20, 21 and 27 have both functions to transmit and not transmit data to user Boxes, an identifier such as a set of characters or a mark can be given to the consolidated data 50 in order that the consolidated data 50 is recognized to be delivered to user Boxes, by detecting the identifier.

A Second Embodiment of the Present Invention

Hereinafter, the second embodiment of the present invention will be explained.

In the first embodiment, the consolidated data 50 is inputted in the group Boxes 20, 21, and 27. In the second embodiment, one data that is the consolidated data 50, is circulated among the group Boxes and processed in the group Boxes in a predetermined manner, respectively. Since an image processing apparatus according to the second embodiment has exactly the same configuration as that previously described in the first embodiment, its explanation will be omitted.

<Operations Performed in the Image Processing Apparatus 1>

Figure 8:
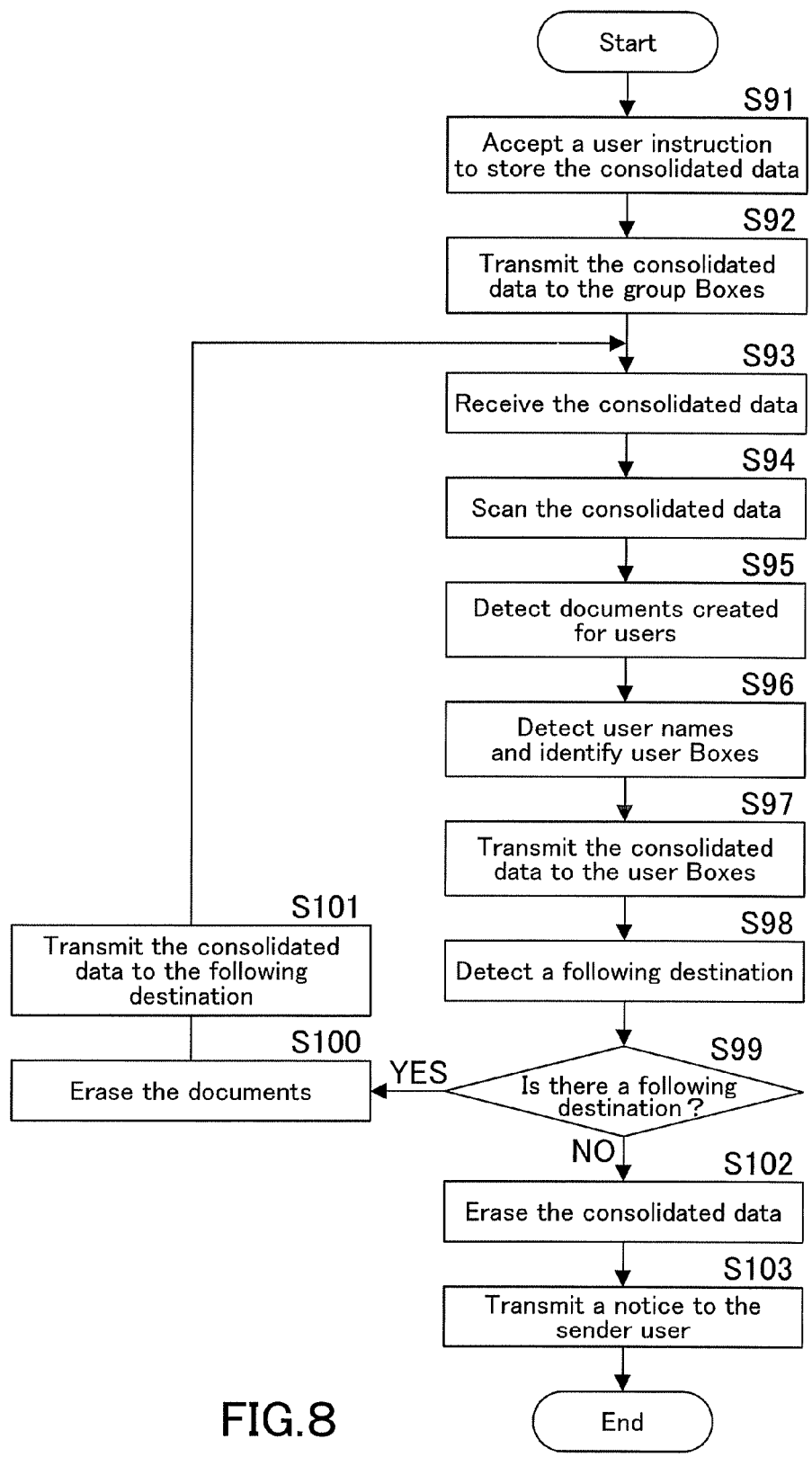
FIG. 8 is a flowchart showing a procedure performed in the image processing apparatus according to a second embodiment of the present invention.

Hereinafter, a procedure performed in the image processing apparatus 1, which is mentioned right above, will be explained with reference to a flowchart shown in FIG. 8. The procedure is executed by the CPU 9 according to a program stored in a recording medium such as the ROM 10.

In the second embodiment, the consolidated data 50 is exactly the same as that used in the first embodiment, and includes the documents 57 through 63 created for users of the groups G1, G2 and G3 as shown in FIG. 5. Further, the group names 51 are listed as G1, G2 and G3, in that order. This description means the consolidated data 50 should be transmitted to the group Box 20 of the group G1, the group Box 21 of the group G2, and the group Box 27 of the group G3, in that order. Thus, the listing order of the group names 51 is circulation information to transmit documents to a plurality of group Boxes in order. Alternatively, data is circulated in order according to numbers or marks, not according to the listing order of the group names 51.

A sender user specifies the consolidated data 50 preliminarily stored in his/her own user Box and gives an instruction to input the data in a group Box (for example the group Box 20), using the operation panel 17 or the terminal apparatus 3. Then, by the CPU 9 of the image processing apparatus 1, this instruction is accepted (Step S91) and the consolidated data 50 is transmitted to the group Box 20 (Step S92). In this way, the consolidated data 50 is inputted in the group Box 20. Alternatively, the consolidated data 50 read out by the scanner 12 or received from the terminal apparatus 3 via the network 4, not the consolidated data 50 preliminarily inputted in his/her own user Box, is directly inputted in the group Box 20.

In this way, the group Box 20 receives the consolidated data 50 (Step S93). Then, by the CPU 9, the consolidated data 50 is scanned (Step S94) and the group name 51 is detected and the documents 57, 58 and 59 created for users of a group owning the group Box 20 are detected based on the group name (Step S95).

Subsequently, by the CPU 9, the user names 52 are detected from the detected documents and user Boxes to which the documents are to be delivered are identified (Step S96), and the documents 57, 58 and 59 are transmitted to the user Boxes 22, 23 and 24 of the users A, B and C, respectively (Step S97).

Further, by the CPU 9, the group name 51 is detected (Step S98), and it is judged whether or not there is a following destination (Step S99). In FIG. 5, it is judged whether or not there is G2 next to G1 in the list as the group name 51.

If it is judged that there is a following destination (YES in Step S99), the documents 57, 58 and 59 created for users of the group G1 and its group name that is G1 are deleted from the consolidated data 50 (Step S100), since those are already detected and not necessary any more. And the consolidated data 50 not having those data is transmitted to the group Box 21 based on the detected group name (Step S101), then the routine returns to Step S93 to repeat Steps S93 through S101 until it is judged that there is no more following destination, in other words, no more following group name in the list.

Meanwhile, if a following destination that is a group Box exists in another image forming apparatus such as the image forming apparatus 2, the documents are transmitted via the network 4.

If it is judged that there is no more following destination (NO in Step S99), by the CPU 9, the consolidated data 50 is deleted (Step S102) since it is not necessary any more. And a notice is transmitted to the sender user to let him/her know the consolidated data is deleted and data delivery is completed (Step S103).

Figure 9:
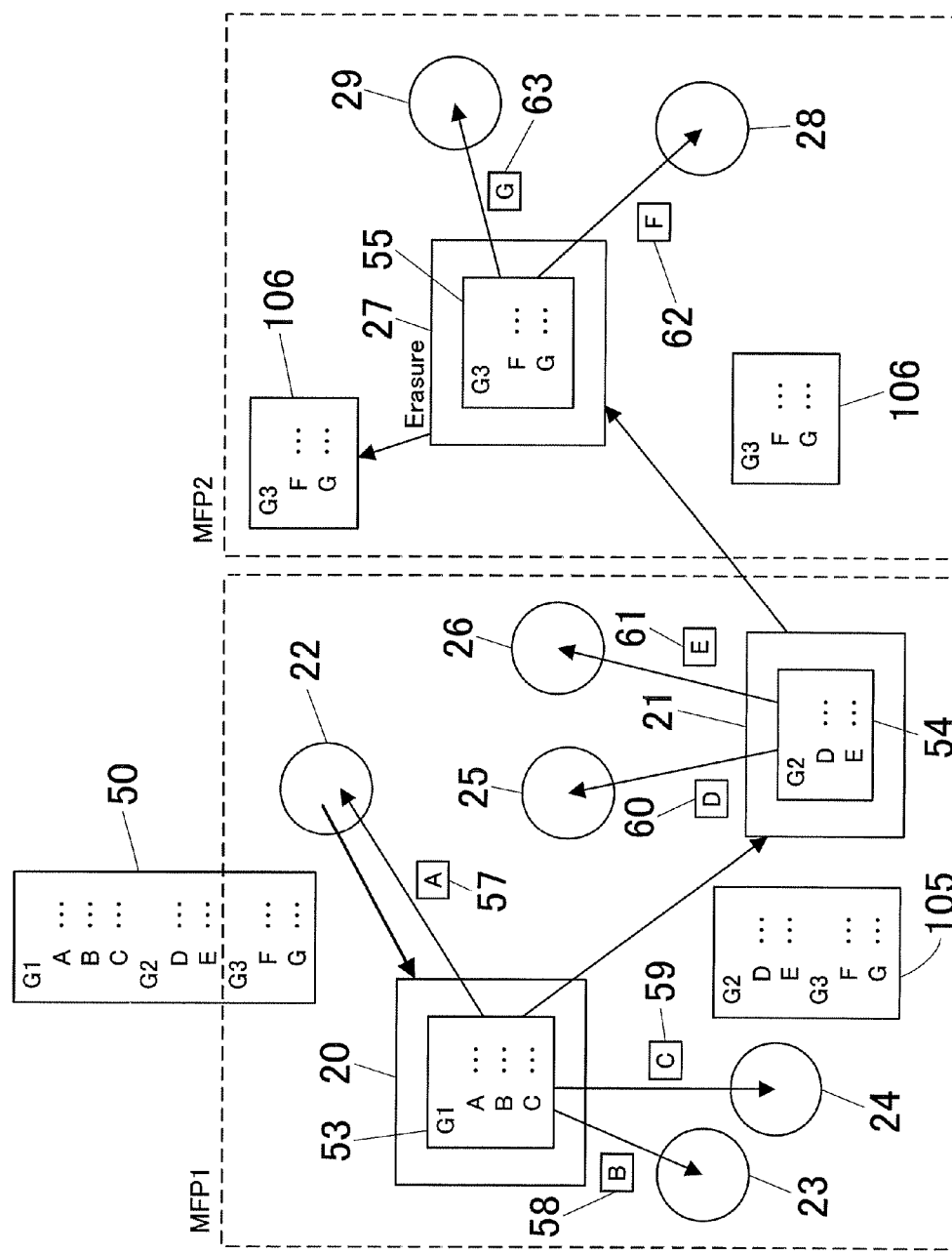
FIG. 9 is a view showing a data flow in the image processing apparatus according to the second embodiment of the present invention.

Switching the view to FIG. 9, if the user A who is a sender user gives an instruction to input in the group Box 20, the consolidated data stored in his/her own user Box 22, the consolidated data 50 is transmitted to the group Box 20.

In this way the consolidated data 50 is inputted in the group Box 20. Then the documents 57, 58 and 59 created for users of the group G1 are detected from the consolidated data 50, user names of the users A, B and C are detected from the documents 57, 58 and 59, and the user Boxes 22, 23 and 24 are identified based on the user names. Then the documents 57, 58 and 59 are transmitted to the user Boxes, respectively.

Further, the consolidated data 50 is scanned. If a following group name that is G2 is detected, the documents 57, 58 and 59 already detected are deleted from the consolidated data 50. Then consolidated data 105 that is the consolidated data 50 not having the documents 57, 58 and 59, is transmitted to the following destination that is the group Box 21.

In the group Box 21 receiving the consolidated data 105, the documents 60 and 61 created for users of the group G2 are detected from the consolidated data 105. Then, user names of the users D and E are detected from the documents 60 and 61, and the user Box 25 and 26 are identified based on the user names. And then, the documents 60 and 61 are transmitted to the user Boxes, respectively.

Further, the consolidated data 105 is scanned. If a following group name that is G3 is detected, consolidated data 106 that is the consolidated data 105 not having the documents 60 and 61 is transmitted to a following destination, the group Box 27. In this embodiment, the consolidated data is transmitted via the network 4 since the group Box 27 exists in the image processing apparatus 2.

In the group Box 27 receiving the consolidated data 106, the documents 62 and 63 are detected from the consolidated data. Then, user names of the users F and G are detected from the documents, and the user Boxes 28 and 29 are identified based on the user names. And then, the documents 62 and 63 are transmitted to the user Boxes 28 and 29, respectively.

Further, the consolidated data 106 is scanned to detect a following destination. However, since there is no more following destination, the consolidated data 106 is deleted from the group Box 27. And a notice is transmitted to the user A who is the sender user to let him/her know the consolidated data 106 is deleted and data delivery is completed. Concretely, a message is displayed on a display provided on the image processing apparatus 1 (e.g. a display of the operation panel 17) if the sender user gives an instruction to store the consolidated data using the operation panel 17 of the image processing apparatus 1. Alternatively, a message is displayed on a display provided on an external device such as the terminal apparatus 3 (e.g. a monitor display of a PC) if the sender user gives an instruction to store the consolidated data using the terminal apparatus 3.

As described above in this embodiment, consolidated data inputted by a sender user is circulated among group Boxes according to circulation information, and documents created for users of groups owning the group Boxes are detected, and a notice is transmitted to the sender user to let him/her know that data delivery is completed, when circulation is completed.

With this configuration, if a user would like to deliver different documents to a plurality of users, he/she is able to achieve the aim simply at one time, which resolves the problem of many operations to transmit documents to a plurality of users manually one by one. Further, if a sender user would like to deliver documents created for users of a plurality of groups, he/she is able to achieve the aim simply by inputting consolidated data in one group Box, which brings much convenience. Further, the sender user is able to know that document delivery is completed, by receiving a notice.

Further, if the consolidated data 50 is transmitted to a following group Box, documents already detected and other unnecessary data are deleted from the consolidated data 50, which means the consolidated data 50 is transmitted without unnecessary information to a following group Box. Thus, size of data to be transmitted is reduced and operations performed in a following group Box to detect data created for users of a group owning the following Box, are simplified.

A Third Embodiment of the Present Invention

Hereinafter, a third embodiment of the present invention will be explained.

In the third embodiment, the consolidated data 50 is stored in the shared storage Box 107 in the image processing apparatus 1, which is used by all uses. And the group Box 20, 21 and 27 access the shared storage Box 107 on a periodic basis to check whether or not there is the consolidated data 50 newly stored. If there is the consolidated data 50 newly stored, the group Boxes obtain the consolidated data and then deliver documents to user Boxes. The Box in which the consolidated data 50 is stored is not limited to the shared storage Box 107.

Since an image processing apparatus according to the third embodiment has exactly the same configuration as that previously described in the first embodiment, its explanation will be omitted.

<Operations Performed in the Image Processing Apparatus 1>

Figure 10:
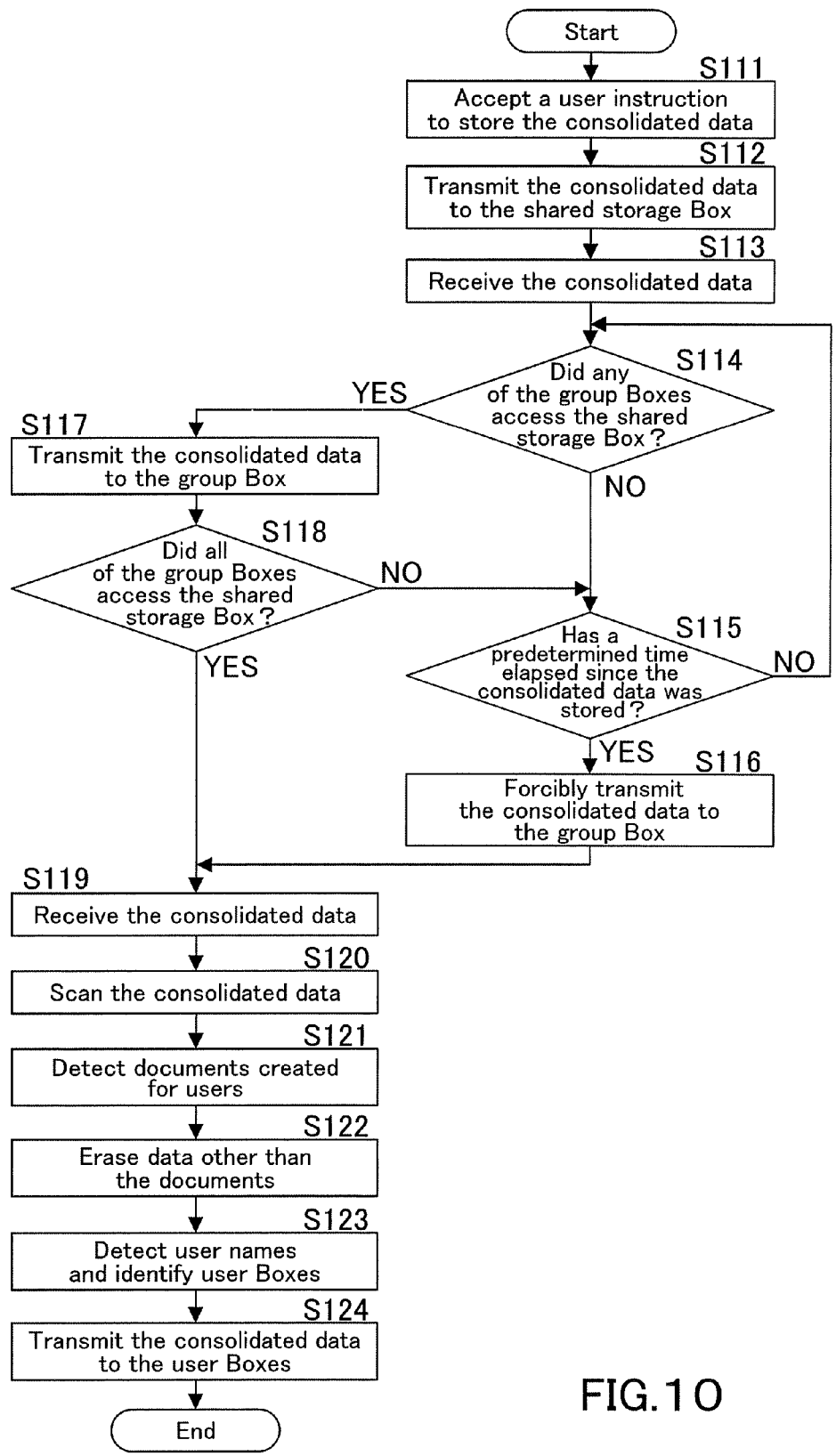
FIG. 10 is a flowchart showing a procedure performed in the image processing apparatus according to a third embodiment of the present invention.

Hereinafter, a procedure performed in the image processing apparatus 1, which is mentioned right above, will be explained with reference to a flowchart shown in FIG. 10. The procedure is executed by the CPU 9 according to a program stored in a recording medium such as the ROM 10.

A sender user specifies the consolidated data 50 preliminarily stored in his/her own user Box and gives an instruction to input the data in the shared storage Box 107, using the operation panel 17 or the terminal apparatus 3. Then, by the CPU 9 of the image processing apparatus 1, this instruction is accepted (Step S111) and the consolidated data 50 is transmitted to the shared storage Box 107 (Step S112). Alternatively, the consolidated data 50 read out by the scanner 12 or received from the terminal apparatus 3 via the network 4, not the consolidated data 50 preliminarily stored in his/her own user Box, is directly transmitted to the shared storage Box 107.

In this way, the shared storage Box 107 receives the consolidated data 50 (Step S113). Then, by the CPU 9, it is judged whether or not any of the group Boxes 20, 21 and 27 accessed the shared storage Box 107, in other words, any of the group Boxes 20, 21 and 27 requested for obtaining the consolidated data 50 (Step S114).

If it is judged that any of the group Boxes 20, 21 and 27 accessed the shared storage Box 107 (YES in Step SI 14), the consolidated data 50 is transmitted to the group Box that accessed the shared storage Box (Step S117), then the routine proceeds to Step S118. If it is judged that at least one of the group Boxes did not access the shared storage Box (NO in Step S114), the routine proceeds to Step S115.

In Step S118, by the CPU 9, it is judged whether or not all of the group Boxes 20, 21 and 27 accessed the shared storage Box. If it is judged that all of the group Boxes accessed the shared storage Box (YES in Step S118), the routine proceeds to Step S119, since it is recognized that all of the group Boxes 20, 21 and 27 obtained the consolidated data 50.

If it is judged that at least one of the group Boxes did not access the shared storage Box (NO in Step S118), the routine proceeds to Step S115.

In Step S115, by the CPU 9, it is judged whether or not a predetermined time has elapsed since the consolidated data 50 was stored in the shared storage Box 107.

If it is judged a predetermined time has elapsed since the consolidated data 50 was stored therein (NO in Step S115), the routine returns to Step S114 to repeat Steps S114, S115, S117 and S118 until it is judged that all the group Boxes accessed the shared storage Box or it is judged that a predetermined time has elapsed since the consolidated data 50 was stored in the shared storage Box. If it is judged that a predetermined time has elapsed since the consolidated data 50 was stored therein (YES in Step S115), the consolidated data 50 is forcibly transmitted by the CPU 9 to the group Box that did not access the shared storage Box (Step S116) in order not to withholding the consolidated data 50 so long without transmitting to the group Box. And then, the routine proceeds to Step S119.

In this way, the group Boxes receive the consolidated data 50 in Step S119. Then, the consolidated data 50 is scanned (Step S120), the documents 57 through 63 created for users of groups owning the group Boxes are detected from the consolidated data 50 based on the group names 51 (Step S121), and unnecessary data, which is other than the detected documents, is deleted from the consolidated data (Step S122).

Subsequently, in order to transmit the documents to user Boxes, by the CPU 9, the user names 52 are detected from the documents and user Boxes to which the documents are to be delivered are identified (Step S123). Then the documents are transmitted to the user Boxes, respectively (Step S124).

Figure 11:
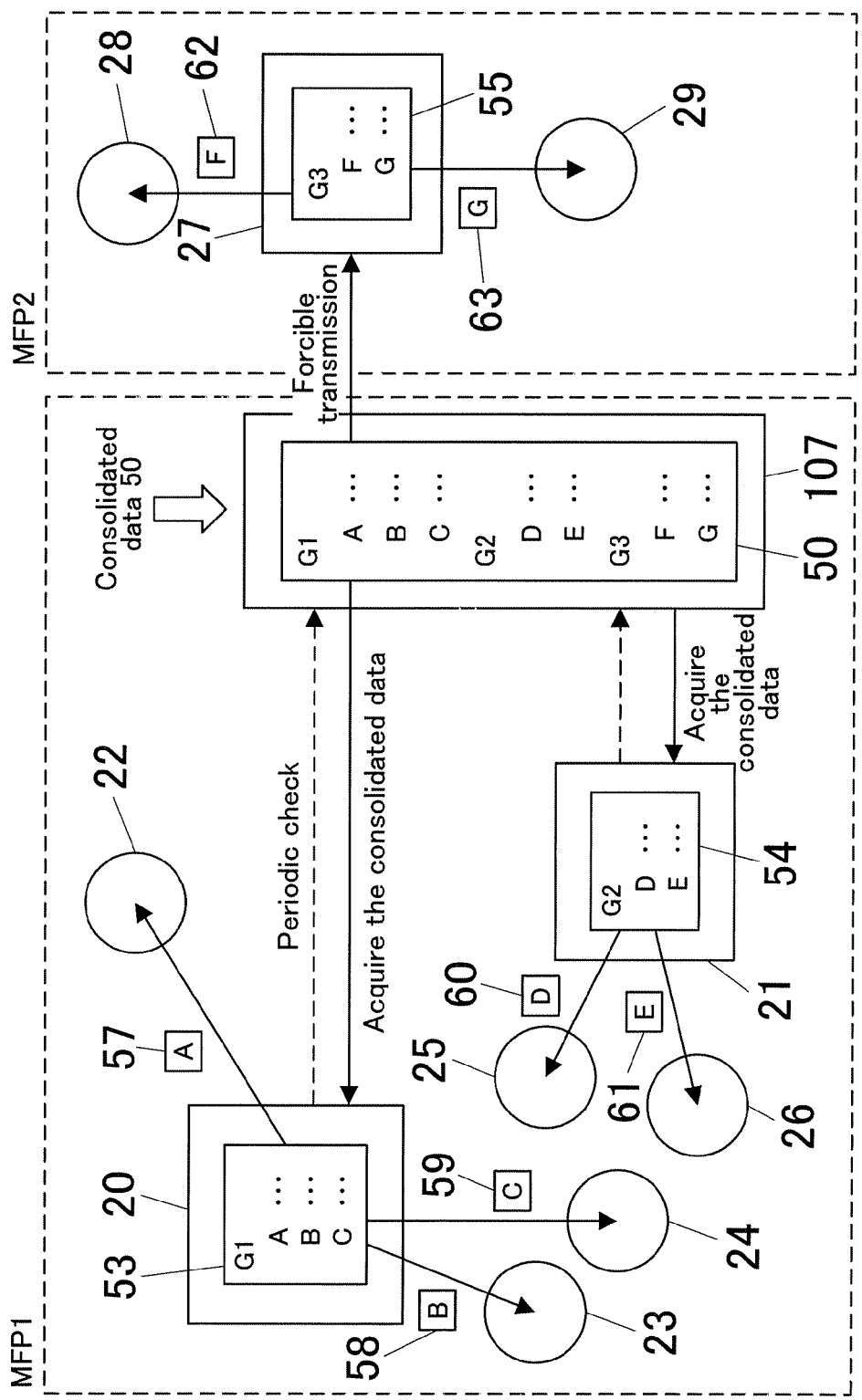
FIG. 11 is a view showing a data flow in the image processing apparatus according to the third embodiment of the present invention.

Switching the view to FIG. 11, the group Box 20, 21 and 27 access the shared storage Box 107 on a periodic basis to check whether or not the consolidated data 50 is newly stored therein. If the user A who is a sender user newly inputs the consolidated data 50 in the shared storage Box 107, the group Boxes obtain the consolidated data 50. If at least one of the group Boxes did not access the shared storage Box even after a predetermined time, the consolidated data 50 is forcibly transmitted to the group Box. In FIG. 11, the data is forcibly transmitted to the group Box 27, accordingly.

In the group Box 20 obtaining the consolidated data 50, the documents 57, 58 and 59 created for users of the group G1 are detected and the other data is deleted from the consolidated data. Then, user names of the users A, B and C are detected from the documents 57, 58 and 59, and the user Boxes 22, 23 and 24 are identified based on the user names. And then, the documents 57, 58 and 59 are transmitted to the user Boxes, respectively.

In the group Box 21 obtaining the consolidated data 50, the documents 60 and 61 created for users of the group G2 are detected and the other data deleted from the consolidated data 50. Then, user names of the users D and E are detected from the documents 60 and 61, and the user Boxes 25 and 26 are identified based on the user names. And then, the documents 60 and 61 are transmitted to the user Boxes, respectively.

In the group Box 27 obtaining the consolidated data 50 forcibly transmitted via the network 4, the documents 62 and 63 created for users of the group G3 are detected and the other data is deleted from the consolidated data 50. Then, user names of the users F and G are detected from the documents 62 and 63, and the user Boxes 28 and 29 are identified based on the user names. And then, the documents 62 and 63 are transmitted to the user Boxes, respectively.

In FIG. 11, the consolidated data 50 is forcibly transmitted to the group Box 27. As a matter of course, another configuration can be used wherein the group Box 27 accesses the shared storage Box 107 on a periodic basis to check whether or not the consolidated data 50 is newly stored therein, and the group Box 27 obtains the consolidated data 50 via the network 4 if it is newly stored therein. In this case, processes performed in the group Box 27 to detect documents created for users of a group owning the group Box and other following processes, are exactly the same as those explained right above.

As described in this embodiment, if the consolidated data 50 is stored in the shared storage Box 107, the group Boxes access the shared storage Box 107 on a periodic basis and obtain the consolidated data 50 stored therein. Further, if any of the group Boxes did not access the shared storage Box, the consolidated data 50 is forcibly transmitted to the group Box after a predetermined time. In the group Boxes obtaining the consolidated data 50 or receiving the consolidated data 50 forcibly transmitted, documents created for users of a group owning the group Boxes are detected, user Boxes are identified, then the documents are transmitted to the user Boxes respectively.

Thus, if a sender user simply stores the consolidated data 50 in the shared storage Box 107, documents are automatically delivered to users of a plurality of groups, which resolves the problem of many operations. Further, since the shared storage Box is used by all users in this embodiment, a sender user delivers documents to users at one time, even if he/she does not have his/her own user Box in the image processing apparatus 1.

A Fourth Embodiment of the Present Invention

Hereinafter, a fourth embodiment of the present invention will be explained.

In the third embodiment, the group Boxes 20, 21 and 27 access the shared storage Box 107 in the image processing apparatus 1 on a periodic basis and obtain the consolidated data 50 stored therein. In the fourth embodiment, the shared storage Box 107 has the sorting function: detecting documents created for users of a plurality of groups from the consolidated data 50 and sorting the documents by groups, and then transmitting the documents to group Boxes respectively.

Since an image processing apparatus according to the fourth embodiment has exactly the same configuration as that previously described in the first embodiment, its explanation will be omitted.

<Operations Performed in the Image Processing Apparatus 1>

Figure 12:
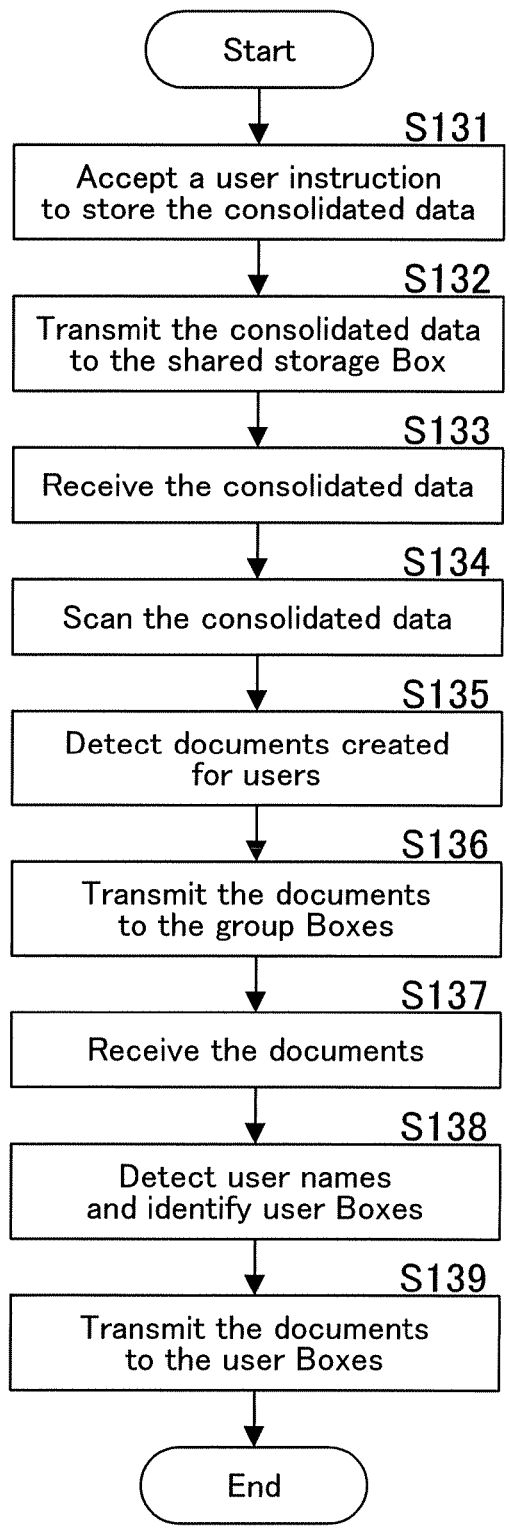
FIG. 12 is a flowchart showing a procedure performed in the image processing apparatus according to a fourth embodiment of the present invention.

Hereinafter, a procedure performed in the image processing apparatus 1, which is mentioned right above, will be explained with reference to a flowchart shown in FIG. 12. The procedure is executed by the CPU 9 according to a program stored in a recording medium such as the ROM 10.

A sender user specifies the consolidated data 50 preliminarily stored in his/her own user Box and gives an instruction to input the data in the shared storage Box 107, using the operation panel 17 or the terminal apparatus 3. Then, by the CPU 9 of the image processing apparatus 1, this instruction is accepted (Step S131) and the consolidated data 50 is transmitted to the shared storage Box 107 (Step S132). Alternatively, the consolidated data 50 read out by the scanner 12 or received from the terminal apparatus 3 via the network 4, not the consolidated data 50 preliminarily stored in his/her own user Box, is directly transmitted to the shared storage Box 107.

In this way, the shared storage Box 107 receives the consolidated data 50 (Step S133). The consolidated data 50 is scanned (Step S134), and the group names 51 are detected; documents created for users of a plurality of groups are detected based on the group names; and the documents are sorted by groups (Step S135). Then the documents are transmitted to the group Boxes 20, 21 and 27, respectively (Step S136). The documents are transmitted to the group Box 27 via the network 4, received via the network controller 13 in the image processing apparatus 2, then stored in the group Box 27.

In this way, the group Boxes 20, 21 and 27 receive the documents created for users of groups owning the group Boxes (Step S137). And user names are detected from the documents and user Boxes are identified based on the user names (Step S138). Then the documents are transmitted to the user Boxes, respectively (Step S139).

Figure 13:
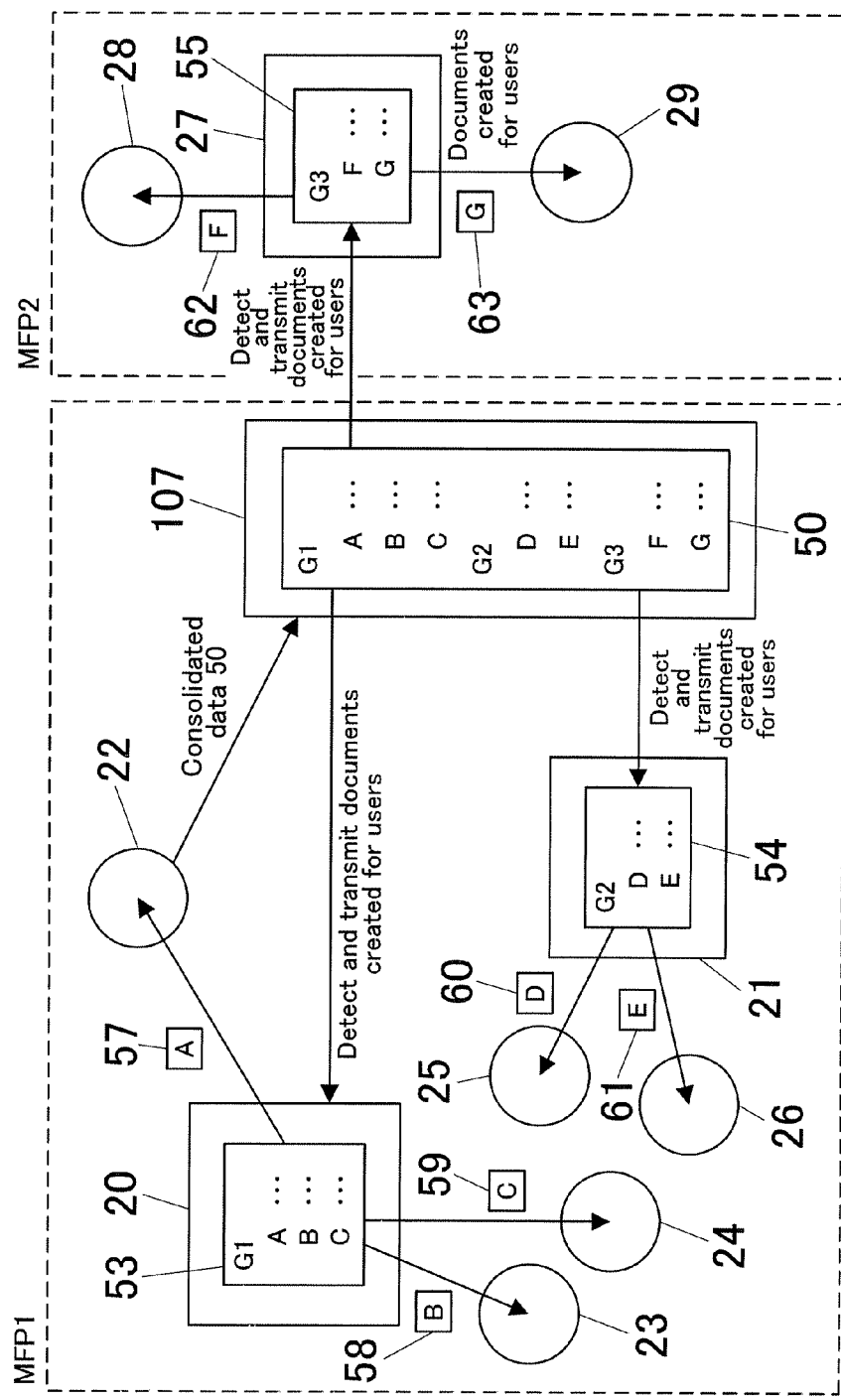
FIG. 13 is a view showing a data flow in the image processing apparatus according to the fourth embodiment of the present invention.

Switching the view to FIG. 13, if the user A who is a sender user newly inputs the consolidated data 50 in the shared storage Box 107, the documents 57, 58 and 59 created for users of the group G1, the documents 60 and 61 created for users of the group G2, and the documents 62 and 63 created for users of the group G3 are detected from the consolidated data 50. The documents 57 through 63 are transmitted to the group Box 20, 21 and 27, respectively.

In the group Box 20, user names of the users A, B and C are detected from the documents 57, 58 and 59, and the user Boxes 22, 23 and 24 are identified based on the user names. Then the documents 57, 58 and 59 are transmitted to the user Boxes, respectively.

Similarly to the case of the data transmitted to the group Box 20, processes are performed on the data transmitted to the group Boxes 21 and 27.

As described above in this embodiment, if the consolidated data 50 is newly stored in the shared storage Box 107, documents created for users of a plurality of groups are detected and sorted by groups, then the documents are transmitted to group Boxes based on the group names 51 that are group information included in the consolidated data 50. In the group Boxes receiving the documents, the documents are transmitted to user Boxes based on user names.

With this configuration, if a sender user simply stores the consolidated data in the shared storage Box, documents are automatically delivered to users, which resolves the problem of many operations. Further, since the shared storage Box is used by all users in this embodiment, a sender user delivers documents to users at one time, even if he/she does not have his/her own user Box in the image processing apparatus 1. Further, an operation performed to access the shared storage Box on a periodic basis is not necessary any more.

In the fourth embodiment, documents created for users of a plurality of groups are detected from the consolidated data stored in the shared storage Box 107, then the documents that are just a part of the consolidated data are transmitted to group Boxes respectively. Alternatively, the entire consolidated data is transmitted to group Boxes, then documents created for users of groups owning the group Boxes are detected therefrom in the group Boxes, respectively.

Those explained above are all preferable embodiments of the present invention. However, the present invention is not limited to those embodiments. For example, a MFP is used as an image processing apparatus in the embodiments. However, an image processing apparatus is not limited to a MFP, and an apparatus having a Box function such as a scanner or a printer, can be used.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus comprising:
   a group storage area that is shared with a plurality of associated users who are members of a group and that receives consolidated data that comprises (i) a plurality of individual documents that are respectively associated with different ones of said plurality of users and each of which is to be respectively delivered to a respective one of the associated users, and (ii) identification information to identify each of the plurality of associated users;
   a respective personal storage area provided for each of the plurality of users and that receives a respective one of the individual documents stored in the group storage area;
   an identifier that identifies the respective personal storage area of each of the associated users to which a respective individual document in a consolidated data stored in the group storage area is to be delivered; and
   a transmitter that separately transmits the individual documents, in the received consolidated data, from the group storage area to the respective personal storage area(s) identified by the identifier so that each user receives a respective one of the individual documents, wherein the transmitter transmits the individual documents to the respective personal storage area(s) of the plurality of associated users in a single transmission.

2. The image processing apparatus as recited in claim 1, wherein:
   the consolidated data includes user's data created for users of a plurality of groups and group information indicating groups to which the user's data belong, and the apparatus further comprises:

a data detector that detects from the consolidated data, the user's data belonging to a group owning a group storage area in which the consolidated data is inputted, based on the group information.

3. The image processing apparatus as recited in claim 2, wherein:
the consolidated data further includes circulation information to transmit the consolidated data to a plurality of group storage areas in order, and the apparatus further comprises:
a circulation information detector that detects the circulation information from the consolidated data inputted in the group storage area, and wherein:
the transmitter transmits the consolidated data to another group storage area that is the following destination, according to the detected circulation information.

4. The image processing apparatus as recited in claim 3, further comprising:
a deleter that deletes from the consolidated data, the user's data detected by the data detector, if the consolidated data is transmitted to another group storage area, wherein:
the transmitter transmits the consolidated data from which the detected data is deleted by the deleter, to another group storage area.

5. The image processing apparatus as recited in claim 3, wherein:
another group storage area that is a following destination exists in another image processing apparatus, and the transmitter transmits via a network the consolidated data to the other group storage area.

6. The image processing apparatus as recited in claim 1, wherein:
the consolidated data is stored in one storage area, and the apparatus further comprises:
a consolidated data obtainer that accesses the storage area on a periodic basis, obtains the consolidated data therefrom, and inputs the obtained consolidated data in the group storage area.

7. The image processing apparatus as recited in claim 6, wherein:
the storage area in which the consolidated data is stored exists in another image processing apparatus, and the consolidated data obtainer obtains via a network the consolidated data from the storage area.

8. The image processing apparatus as recited in claim 1, wherein:
the consolidated data includes user's data created for users of a plurality of groups and group information indicating groups to which the user's data belong, and the consolidated data is stored in one storage area, the apparatus further comprising:
a sorter that detects from the consolidated data stored in the storage area, the user's data created for users of a plurality of groups, and sorts the user's data by groups, and then transmits the user's data to group storage areas owned by the groups, based on the group information.

9. The image processing apparatus as recited in claim 8, wherein:
the storage area in which the consolidated data is stored exists in another image processing apparatus, and the apparatus further comprises:
a receiver that receives via a network the user's data, and inputs the received user's data in a group storage area.

10. A data delivery method comprising:
identifying a respective personal storage area of each of a plurality of associated users who are members of a group, the group having a group storage area that receives consolidated data that comprises (i) a plurality of individual documents that are respectively associated with different ones of said plurality of associated users and each of which is to be respectively delivered to a respective one of the associated users, and (ii) identification information to identify each of the plurality of associated users to which a respective individual document in a consolidated data stored in the group storage area is to be delivered; and
transmitting separately the individual documents, in the received consolidated data, from the group storage area to the identified respective personal storage area(s) so that each user receives a respective one of the individual documents, wherein the transmitting transmits the individual documents to the respective personal storage area(s) of the plurality of associated users in a single transmission.

11. The data delivery method as recited in claim 10, wherein:
the consolidated data includes user's data created for users of a plurality of groups and group information indicating groups to which the user's data belong, and the method further comprises the step of:
detecting from the consolidated data, the user's data belonging to a group owning a group storage area in which the consolidated data is inputted, based on the group information.

12. A data delivery program stored in a computer readable recording medium, the data delivery program when executed by a processor causing a computer of an image processing apparatus to execute the following steps:
identifying a respective personal storage area of each of a plurality of associated users who are members of a group, the group having a group storage area that receives consolidated data that comprises (i) a plurality of individual documents that are respectively associated with different ones of said plurality of associated users and each of which is to be respectively delivered to a respective one of the associated users, and (ii) identification information to identify each of the plurality of associated users to which a respective individual document in a consolidated data stored in the group storage area is to be delivered; and
transmitting separately the individual documents, in the received consolidated data, from the group storage area to the identified respective personal storage area(s) so that each user receives a respective one of the individual documents, wherein the transmitting transmits the individual documents to the respective personal storage area(s) of the plurality of associated users in a single transmission.

13. The data delivery program as recited in claim 12, wherein:
the consolidated data includes user's data created for users of a plurality of groups and group information indicating groups to which the user's data belong, and the program further makes the computer execute:
detecting from the consolidated data, the user's data belonging to a group owning a group storage area in which the consolidated data is inputted, based on the group information.

14. The data delivery program as recited in claim 13, wherein:
the consolidated data further includes circulation information to transmit the consolidated data to a plurality of group storage areas in order, and the program further makes the computer execute:

detecting the circulation information from the consolidated data inputted in the group storage area; and transmitting the consolidated data to another group storage area that is the following destination, according to the detected circulation information.

15. The data delivery program as recited in claim 14, further making the computer execute:

erasing the user's data detected from the consolidated data, if the consolidated data is transmitted to another group storage area; and transmitting the consolidated data from which the detected data is deleted in the prior step, to another group storage area.

16. The data delivery program as recited in claim 15, wherein:

another group storage area that is a following destination exists in another image processing apparatus, the program further makes the computer execute:

transmitting the consolidated data via a network to another group storage area.

17. The data delivery program as recited in claim 12, wherein:

the consolidated data is stored in one storage area, and the program further makes the computer execute:

accessing the storage area on a periodic basis, obtaining the consolidated data therefrom, and transmitting the obtained consolidated data to the group storage area.

18. The data delivery program as recited in claim 17, wherein:

the storage area in which the consolidated data is stored exists in another image processing apparatus, and the consolidated data is obtained via a network from the storage area in the obtaining step.

19. The data delivery program as recited in claim 12, wherein:

the consolidated data includes user's data created for users of a plurality of groups and group information indicating groups to which the user's data belong, and the consolidated data is stored in one storage area, and the program further making the computer execute:

detecting from the consolidated data stored in the storage area, the user's data created for users of a plurality of groups, and sorting the user's data by groups, and then transmitting the user's data to group storage areas owned by the groups, based on the group information.

20. The data delivery program as recited in claim 19, wherein:

the storage area in which the consolidated data is stored exists in another image processing apparatus, and the program further makes the computer execute:

receiving via a network the user's data, and inputting the received user's data in group storage areas, respectively.

21. The data delivery method as recited in claim 11, wherein:

the consolidated data further includes circulation information to transmit the consolidated data to a plurality of group storage areas in order, and the method further comprises:

detecting the circulation information from the consolidated data inputted in the group storage area; and transmitting the consolidated data to another group storage area that is the following destination, according to the detected circulation information.

22. The data delivery method as recited in claim 21, further comprising:

erasing the user's data detected from the consolidated data, if the consolidated data is transmitted to another group storage area; and transmitting the consolidated data from which the detected data is deleted in the prior step, to another group storage area.

23. The data delivery method as recited in claim 22, wherein:

another group storage area that is a following destination exists in another image processing apparatus, the method further comprising:

transmitting the consolidated data via a network to another group storage area.

24. The data delivery method as recited in claim 10, wherein:

the consolidated data is stored in one storage area, and the method further comprises:

accessing the storage area on a periodic basis, obtaining the consolidated data therefrom, and transmitting the obtained consolidated data to the group storage area.

25. The data delivery method as recited in claim 24, wherein:

the storage area in which the consolidated data is stored exists in another image processing apparatus, and the consolidated data is obtained via a network from the storage area in the obtaining step.

26. The data delivery method as recited in claim 10, wherein:

the consolidated data includes user's data created for users of a plurality of groups and group information indicating groups to which the user's data belong, and the consolidated data is stored in one storage area, and the method further comprising:

detecting from the consolidated data stored in the storage area, the user's data created for users of a plurality of groups, and sorting the user's data by groups, and then transmitting the user's data to group storage areas owned by the groups, based on the group information.

27. The data delivery method as recited in claim 26, wherein:

the storage area in which the consolidated data is stored exists in another image processing apparatus, and the method further comprises:

receiving via a network the user's data, and inputting the received user's data in group storage areas, respectively.

* * * * *